US012569322B2

(12) United States Patent
Kohler

(10) Patent No.: US 12,569,322 B2
(45) Date of Patent: Mar. 10, 2026

(54) FLOSSER ATTACHMENT FOR DENTAL TOOL

(71) Applicant: ONVI III, LLC, Wilmette, IL (US)

(72) Inventor: Craig Kohler, Glenview, IL (US)

(73) Assignee: ONVI III, LLC, Wilmette, IL (US)

( * ) Notice: Subject to any disclaimer, the term of this patent is extended or adjusted under 35 U.S.C. 154(b) by 380 days.

(21) Appl. No.: 17/906,573

(22) PCT Filed: Mar. 17, 2021

(86) PCT No.: PCT/US2021/022775
§ 371 (c)(1),
(2) Date: Sep. 16, 2022

(87) PCT Pub. No.: WO2021/188679
PCT Pub. Date: Sep. 23, 2021

(65) Prior Publication Data
US 2023/0181298 A1 Jun. 15, 2023

Related U.S. Application Data

(60) Provisional application No. 62/991,224, filed on Mar. 18, 2020.

(51) Int. Cl.
*A61C 15/04* (2006.01)
(52) U.S. Cl.
CPC .................................. *A61C 15/048* (2013.01)
(58) Field of Classification Search
CPC .......... A46B 15/0036; A46B 9/04–045; A46B 15/0069–0073; A46B 2200/1066–1086
See application file for complete search history.

(56) References Cited

U.S. PATENT DOCUMENTS

| | | | | |
|---|---|---|---|---|
| 3,236,247 A | * | 2/1966 | Brockman | ........... A61C 15/046 |
| | | | | D28/68 |
| 3,631,869 A | * | 1/1972 | Espinosa | .............. A61C 15/046 |
| | | | | 132/323 |
| 3,792,706 A | * | 2/1974 | Keese | .................. A61C 15/046 |
| | | | | 132/324 |

(Continued)

FOREIGN PATENT DOCUMENTS

| | | | | |
|---|---|---|---|---|
| JP | H07171169 A | * | 7/1995 | ........... A61C 15/046 |
| JP | 2014124505 A | | 7/2014 | |

(Continued)

OTHER PUBLICATIONS

ISA/US, Int. Search Report and Written Opinion issued on PCT application No. PCT/US21/22775, dated Jun. 3, 2021, 10 pages.

(Continued)

*Primary Examiner* — Tatiana L Nobrega
(74) *Attorney, Agent, or Firm* — Greenberg Traurig, LLP

(57) ABSTRACT

A dental flosser includes a flosser member configured to secure a piece of dental floss. The flosser member includes a shoulder portion comprising a hinge and two arms coupled to the shoulder portion, each arm configured to secure a respective end of the piece of dental floss. The flosser also includes an adjustment body coupled to the flosser member, whereby linear movement of the adjustment body causes the flosser member arms to articulate about the hinge.

12 Claims, 12 Drawing Sheets

(56)  References Cited

U.S. PATENT DOCUMENTS

| | | | | |
|---|---|---|---|---|
| 4,051,857 A * | 10/1977 | Zambito | .............. | A61C 15/046 |
| | | | | 132/323 |
| 4,404,978 A * | 9/1983 | Withers | .............. | A61C 15/046 |
| | | | | 132/323 |
| 4,832,062 A * | 5/1989 | Grollimund | ......... | A61C 15/046 |
| | | | | 132/327 |
| 5,139,038 A * | 8/1992 | El Gazayerli | ........ | A61C 15/046 |
| | | | | 132/324 |
| 5,160,194 A * | 11/1992 | Feldman | ............ | A46B 15/0002 |
| | | | | 362/253 |
| 5,188,133 A | 2/1993 | Romanus | | |
| 5,224,500 A * | 7/1993 | Stella | ..................... | A61C 17/26 |
| | | | | 132/322 |
| 5,429,145 A * | 7/1995 | Bral | ..................... | A61C 15/046 |
| | | | | 132/323 |
| 5,860,435 A * | 1/1999 | Hippensteel | ......... | A61C 15/046 |
| | | | | 132/325 |
| 6,220,256 B1 | 4/2001 | Dolan et al. | | |
| 10,779,637 B2 * | 9/2020 | Duncan | ................ | A46B 11/001 |
| 2003/0196677 A1 | 10/2003 | Wiseman | | |
| 2004/0134512 A1 | 7/2004 | Ding et al. | | |
| 2005/0217693 A1 * | 10/2005 | Landis | ................. | A61C 15/046 |
| | | | | 132/323 |
| 2008/0257378 A1 * | 10/2008 | Jansheski | ............. | A61C 15/046 |
| | | | | 362/109 |
| 2016/0296308 A1 | 10/2016 | Ackel | | |
| 2018/0289143 A1 * | 10/2018 | Jimenez | ................... | A46B 9/04 |
| 2019/0014897 A1 * | 1/2019 | Jimenez | ................... | A46B 7/06 |

FOREIGN PATENT DOCUMENTS

| | | |
|---|---|---|
| JP | 2020505080 A | 2/2020 |
| KR | 101387383 B1 | 4/2014 |

OTHER PUBLICATIONS

Office Action from JP application No. 2022-556472, dated Nov. 5, 2024, 8 pp.

Office Action from Japanese application No. 2022-556472, dated Aug. 12, 2025, 6 pp.

Office Action from Chinese application No. 202180035802.4, dated Jun. 25, 2025, 11 pp.

* cited by examiner

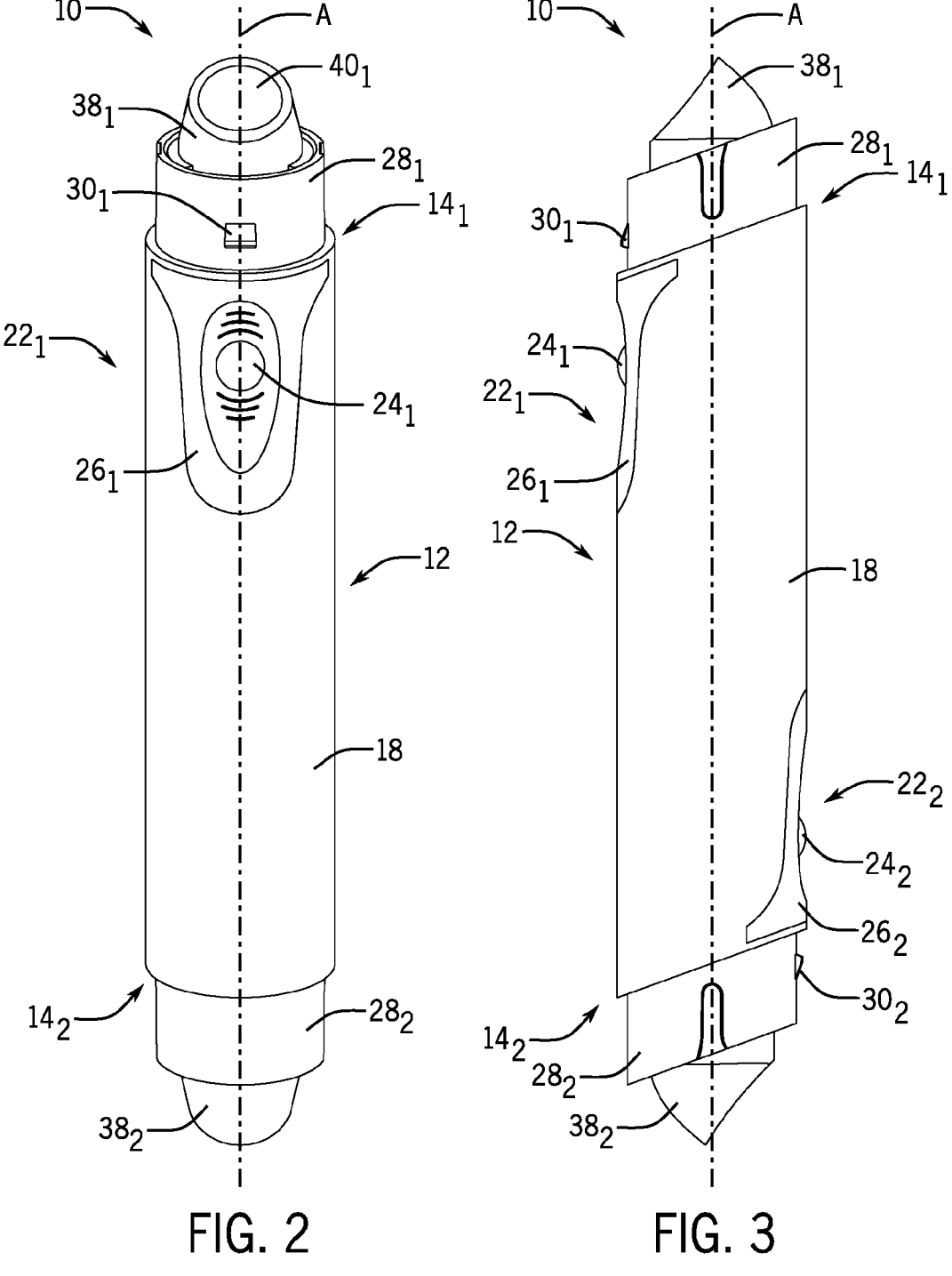
FIG. 2          FIG. 3

FLOSSER ATTACHMENT FOR DENTAL TOOL

CROSS-REFERENCE TO RELATED APPLICATION

This application claims priority to U.S. provisional application No. 62/991,224, filed Mar. 18, 2020, and hereby incorporated by reference in its entirety.

BACKGROUND

The present disclosure relates to devices for oral care, including manual care in conjunction with orthodontia. The devices of the present disclosure may also find use for a user without orthodontia.

Orthodontic treatments, such as braces, retainers, and the like, may be difficult for a user (e.g., wearer of the treatment) to clean and maintain, and may make it difficult for a user to clean his or her teeth. Even in the absence of orthodontia, existing tools for spot cleaning a user's teeth (e.g., tools other than toothbrushes) may not be sufficiently reusable or of sufficient quality to fulfill a user's needs.

BRIEF DESCRIPTION OF THE DRAWINGS

FIGS. 2 and 3 are front and side views, respectively, of the example double-ended dental tool of FIG. 1, without attached tools.

DETAILED DESCRIPTION

The instant disclosure provides a double-ended dental tool for oral care, including for cleaning a user's teeth and orthodontic treatments. The tool may include opposed ends, with one or both of the ends having removable and replaceable tool attachments, including one or more scrapers, mirrors, scalers, brushes, and the like. The tool attachments may be interchangeable, such that a user may arrange the attachment configuration that the user prefers (e.g., a scraper and a scaler, or a scaler and a mirror, or a mirror and a brush, etc.). The tool attachments may also be durable, such that each attachment may be used by a user numerous times before requiring replacement. In addition, the tool may include a light source at one or both ends for illuminating attached tools.

Figure 1:
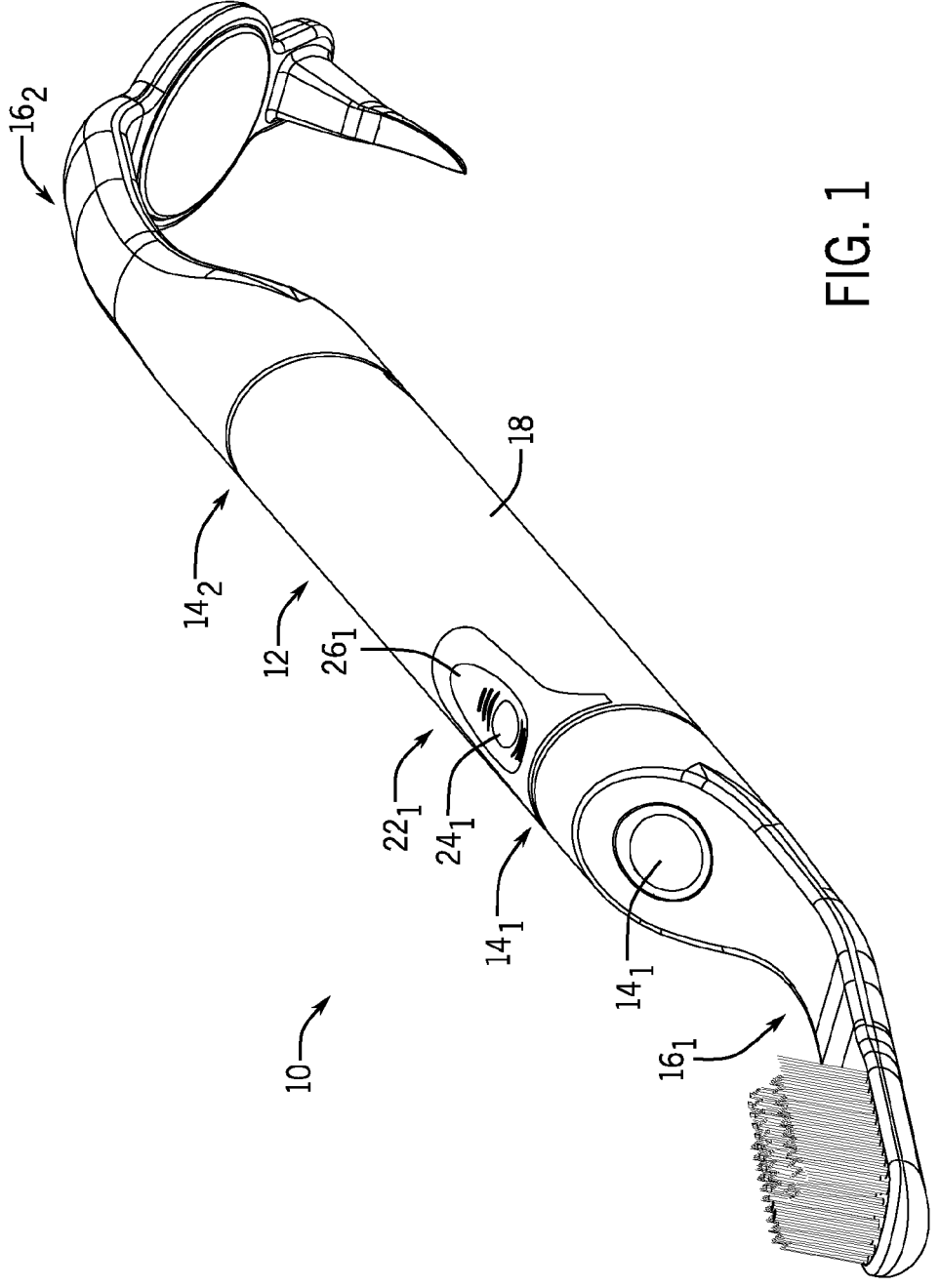
FIG. 1 is a perspective view of an example embodiment of a double-ended dental tool with attached tools.
Figure 4:
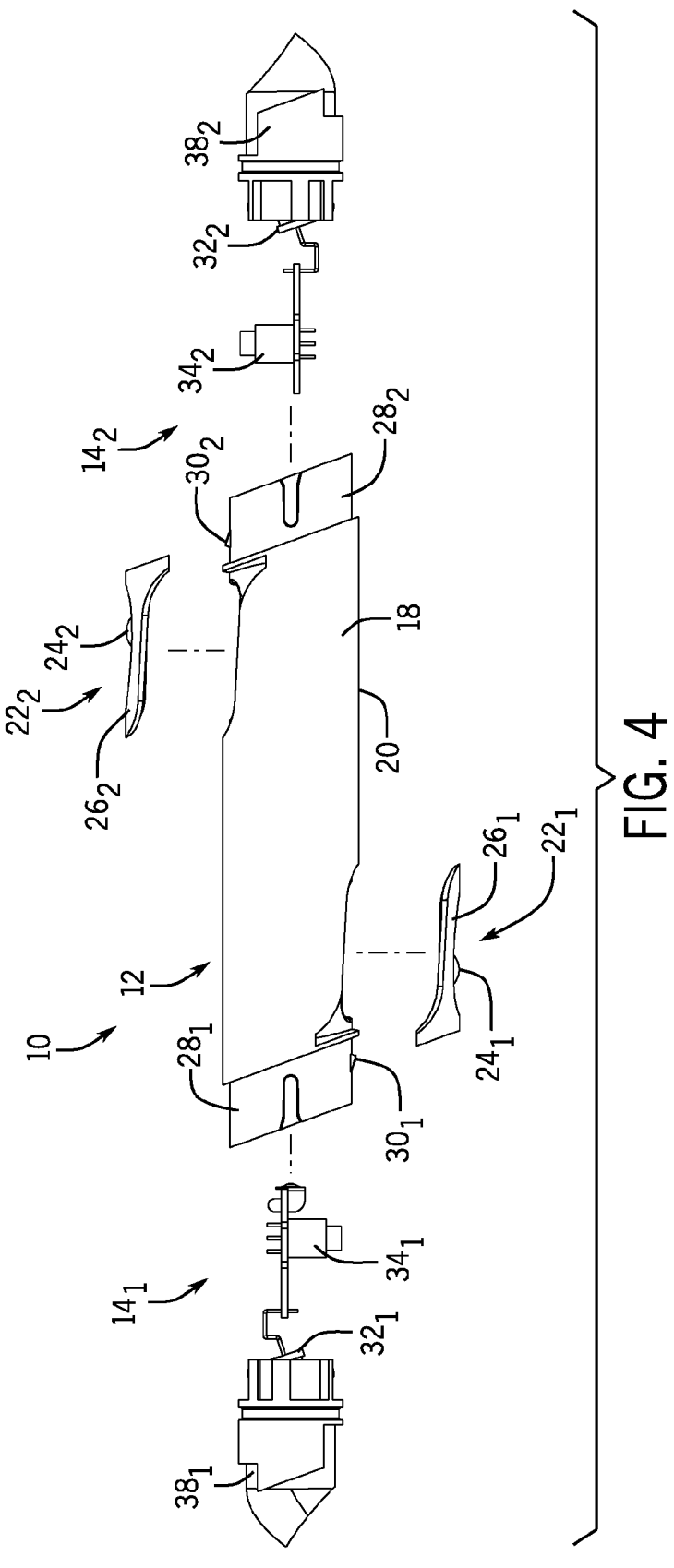
FIG. 4 is a partially-exploded view of the example double-ended dental tool of FIG. 1, without attached tools.
Figure 5:
FIG. 5 is a cross-sectional view of the example double-ended dental tool of FIG. 1, with attached tools.

FIGS. 1-5 are various views of an example embodiment of a double-ended dental tool 10. FIGS. 1 and 5 illustrate the double-ended tool 10 with attachments. In contrast, FIGS. 2, 3, and 4 illustrate the double-ended tool 10 without attachments. The double-ended tool 10 may include a main body portion 12, a first longitudinal end $14_1$, and a second longitudinal end $14_2$. A first attachment $16_1$ may be removably coupled to the main body 12 at the first end $14_1$, and a second attachment $16_2$ may be removably coupled to the second end $14_2$. When attached, the first tool $16_1$, or a portion thereof, may extend at an angle from the main body portion 12, and the second tool 162 may extend at the opposite angle.

The main body portion 12 may include an outer cylindrical portion 18 and an inner cylindrical portion 20 (shown in FIGS. 4 and 5) that is disposed radially inward of the outer cylindrical portion 18. The outer cylindrical portion may define a central longitudinal axis A (illustrated in FIGS. 2 and 3). References in this disclosure to longitudinal or radial relationships are with reference to directions defined by the axis A. The main body portion 12 may have an outer profile that is substantially cylindrical along the entire longitudinal length of the main body portion 12. The main body portion 12 may further include switch portions $22_1$, $22_2$ on radially opposite sides of the main body portion 12 and at opposite longitudinal ends $14_1$, $14_2$ of the main body portion 12. The switch portions 22 may include respective buttons $24_1$, $24_2$, and switch surfaces $26_1$, $26_2$. Each button 24 may operate a respective light source (as will be described below).

Although the switch portions 22 are illustrated and described herein as including buttons 24, other switch types may find use in the tool 10. For example, slider switches, twist-style switches, or any other appropriate type of switches may be included in the tool 10 for actuation by the user to operate light sources of the tool 10.

Each end $14_1$, $14_2$ of the main body portion 12 may include a respective reduced-diameter portion $28_1$, $28_2$. In an embodiment, the reduced-diameter portion is a portion of the outer cylindrical portion 18, as illustrated in FIGS. 1-5.

The attachments 16 may couple with the reduced-diameter portions 28 so as to couple the attachments with the main body portion 12. In an embodiment, each reduced diameter portion $28_1$, $28_2$ may include a mating formation $30_1$, $30_2$ which may mate with a counterpart formation on an attachment 16 (as will be described below). In an embodiment, each mating formation 30 may be a protrusion on the reduced-diameter portion 28.

The double-ended tool 10 may include one or more light sources $32_1$, $32_2$ (shown in FIGS. 4 and 5) for selectively illuminating the attachments $16_1$, $16_2$. The light sources $32_1$, $32_2$ may be disposed at the first end $14_1$ and the second end $14_2$, respectively. The light sources 32 may be disposed within the main body portion 12. The light sources 32 may be or may include light-emitting diodes (LEDs), in an embodiment. In other embodiments, the light sources 32 may be or may include alternate types of light sources, such as halogen, fluorescent, or another light source type. In some embodiments, one or both of the light sources may emit light in the visible spectrum when coupled with a power source. In an embodiment, one or both of the light sources 32 may emit ultraviolet light when coupled with a power source. The light sources 32 may be arranged so as to illuminate the working portion of a tool attachment when the tool attachment is coupled to the main body portion 12 and the light source is electrically coupled to a power source.

The light sources $32_1$, $32_2$ may be electrically coupled with respective electrical switches $34_1$, $34_2$ which may be in physical contact with the buttons $24_1$, $24_2$ and which may further be electrically coupled with a power source such that, when a user actuates a button 24, the electrical switch 34 electrically couples a respective light source 32 to, or electrically decouples a respective light source from, the power source (e.g., via one or more printed circuit boards (PCBs), electrical contacts, and/or other appropriate electrical coupling devices). The power source may be a battery 36 (shown in FIG. 5), in some embodiments. In the example of FIGS. 4 and 5, the first button $24_1$ actuates the first electrical switch $34_1$. When actuated, the first electrical switch $34_1$ couples the first light source $32_1$ to, or decouples the first light source $32_1$ from, the battery 36. Similarly, the second button $24_2$ actuates the second electrical switch $34_2$. When actuated, the second electrical switch $34_2$ couples the second light source $32_2$ to, or decouples the second light source $32_2$ from, the battery 36.

The double-ended tool 10 may further include a respective light housing $38_1$, $38_2$ associated with each light source $32_1$, $32_2$. Each light housing 38 may be disposed radially about its respective light source 32. Each light housing 38 may be disposed within the main body portion 12, radially-inward from the outer body portion 18. The light housing 38 may be waterproof when properly disposed within the main body portion 12. Accordingly, each light housing 38 may be coupled with a gasket or other sealing device around the periphery of the light housing 38 so as to prevent ingress of fluid into the main body portion 12. The main body portion 12 may be fluid-tight, in embodiments, to prevent exposure of electrical components within the main body portion 12 to liquid. Fluid tight construction may be provided by, for example, tightness of fit between and among cylindrical portions 18, 20 of the main body portion, battery housings, and light covers (described below), as well as by one or more gaskets or other sealing devices as described herein.

Each light housing $38_1$, $38_2$ may include a respective light-transmissive cover $40_1$, $40_2$ that permits light from a respective light source 32, such that the light source 32 emits light through the light-transmissive cover 40 to illuminate an attachment 16. A light-transmissive cover may comprise, for example, acrylic material, in embodiments. Each light-transmissive cover 40 may be disposed at a longitudinal end of the main body portion 12, such that light is emitted from a longitudinal end of the main body portion 12 when a light source 32 is coupled with the power source. Further, each light-transmissive cover 40 may be provided within a reduced-diameter portion 28 of the main body portion 12, such that a light source 32 projects light from the reduced-diameter portions of the main body portion 12. Each light cover $40_1$, $40_2$ and light source $32_1$, $32_2$ may be oriented so that an attachment is illuminated by the light source 32. For example, the light cover 40 may be angled at between 30 and 60 degrees relative to the longitudinal axis A, in some embodiments. The light cover 40 may be angled at between 35 and 55 degrees relative to the longitudinal axis A, in some embodiments. The light cover 40 may be angled at between 40 and 50 degrees relative to the longitudinal axis A, in some embodiments. The light cover 40 may be angled at approximately 45 degrees relative to the longitudinal axis A, in some embodiments. The light covers $40_1$, $40_2$ may be angled in opposite directions from the axis A, with the same absolute value of the angle, as illustrated in FIGS. 1-5, in some embodiments. In other words, the light covers 40 may be arranged on radially-opposite sides of the main body portion 12, in embodiments, as illustrated in FIGS. 1-5. In an embodiment, a light source 32 may project light at an angle relative to the longitudinal axis A that is the same as the angle between the axis A and the light cover 40 associated with that light source 32.

Each light housing 38 may include, at its longitudinal end, a reduced-diameter portion that is radially separated from a reduced-diameter portion of the outer cylindrical portion 18 so as to define an annular space therebetween. As will be described below, an attachment 16 may interact with the annular space between the reduced-diameter portion of the light housing 38 and the reduced-diameter portion 28 of the outer cylindrical portion 18 so as to secure the attachment 16 to the main body portion 12.

The outer cylindrical portion 18 may comprise a thermoplastic polymer, such as acrylonitrile butadiene styrene, for example only, in some embodiments. In other embodiments, the outer cylindrical portion 18 may comprise metal or another rigid material.

The switch portions 22 may comprise a thermoplastic elastomer, thermoplastic polyurethane, and/or other material. The switch portions 22 may comprise a material that is softer and/or tackier than the materials comprising the outer cylindrical portion 18, in some embodiments.

Figures 6, 7, 8, 9, 10, 11, 12:
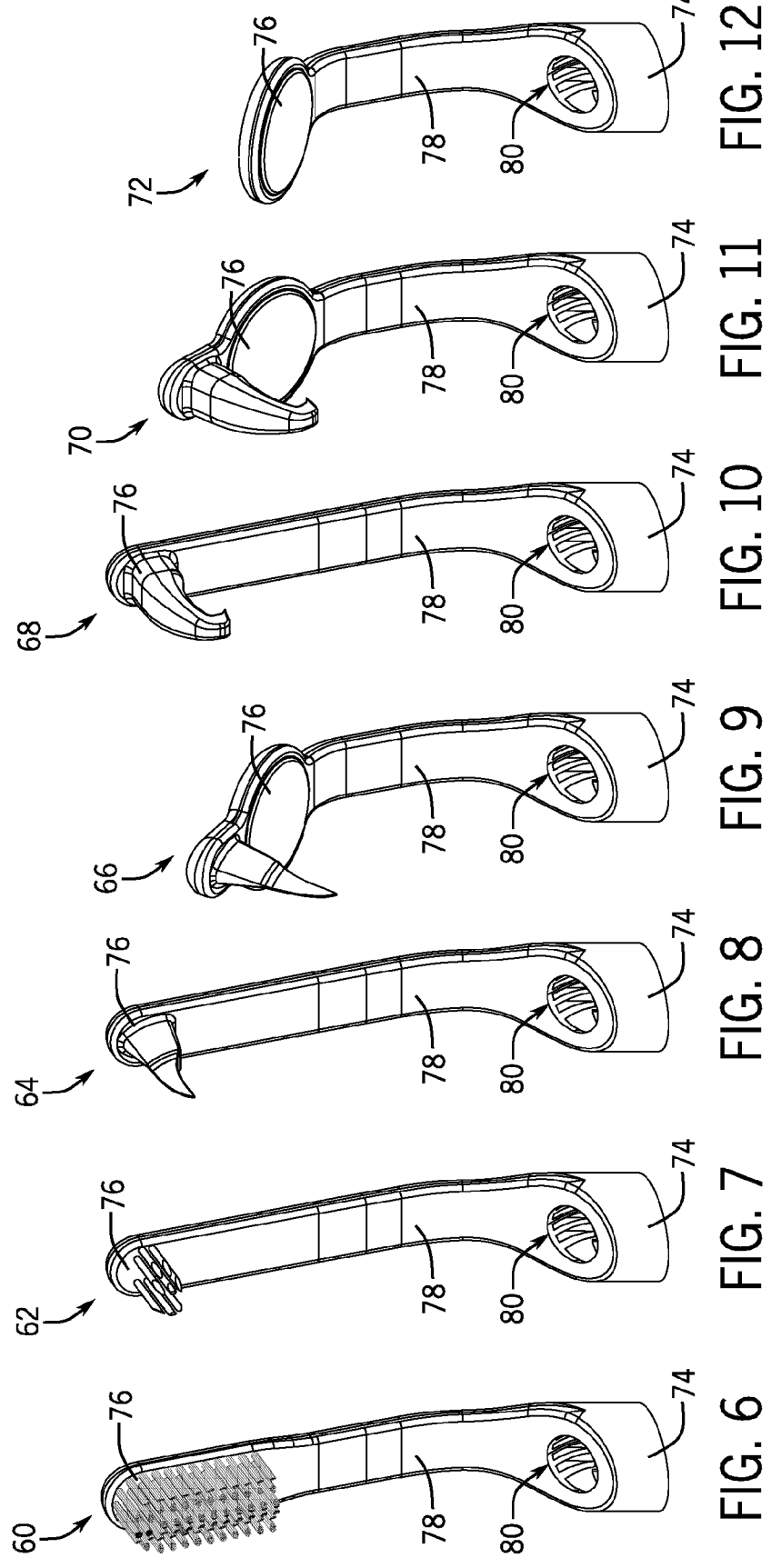
FIGS. 6-12 are perspective views, respectively, of example embodiments of a bristle brush tool attachment, an orthodontic brush tool attachment, a scaler tool attachment, a scaler with mirror tool attachment, a scraper tool attachment, a scraper with mirror tool attachment, and a mirror tool attachment that may find use with a double-ended dental tool according to the present disclosure.
Figure 15:
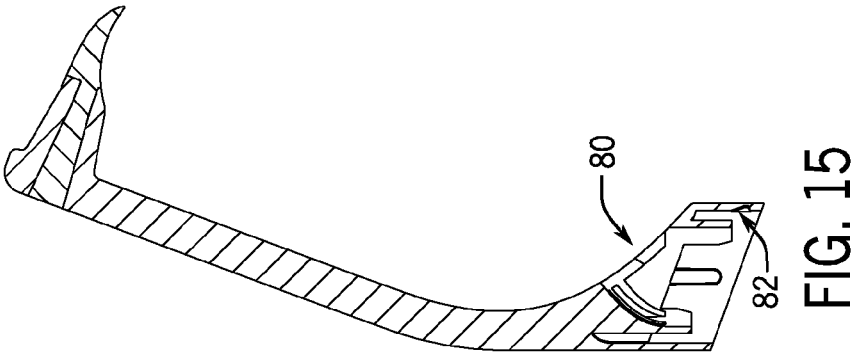
FIG. 15 is a cross-sectional view of the scaler tool attachment of FIG. 8.
Figure 14:
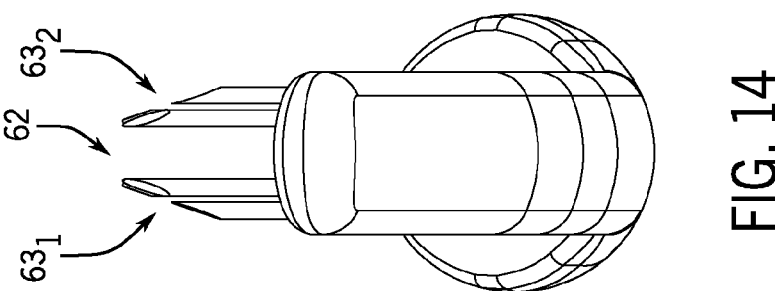
FIG. 14 is a top view of the orthodontic brush tool attachment of FIG. 7.
Figure 13:
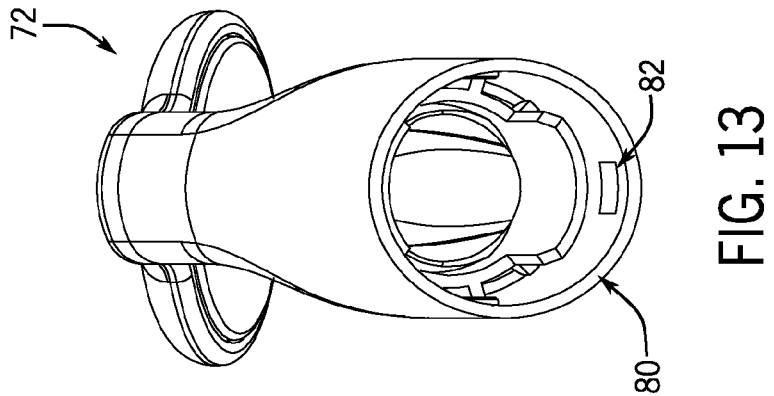
FIG. 13 is a lower perspective view of the mirror tool attachment of FIG. 12.

FIGS. 6-15 illustrate various attachments that may find use with the main body portion 12. Specifically, FIG. 6 is a perspective view of an example embodiment of a bristle brush tool attachment 60, FIGS. 7 and 14 are perspective and top views, respectively, of an example embodiment of an orthodontic brush tool attachment 62, FIGS. 8 and 15 are perspective and cross-sectional views, respectively, of an example embodiment of a scaler tool attachment 64, FIG. 9 is a perspective view of an example embodiment of a scaler with mirror tool attachment 66, FIG. 10 is a perspective view of an example embodiment of a scraper tool attachment 68, FIG. 11 is a perspective views of an example embodiment of a scraper with mirror tool attachment 70, and FIGS. 12 and 13 are perspective views of an example embodiment of a mirror tool attachment 72, each of which may find use with a double-ended dental tool 10 according to the present disclosure.

Any of the attachments 60, 62, 64, 66, 68, 70, 72, 84, 90, or other appropriate attachment (such as flosser attachments 100, 200 described below), may find use as an attachment $14_1$, $14_2$ with the main body portion 12. The attachments 60, 62, 64, 66, 68, 70, 72, 84, 90, 100, 200 may be interchangeably used on either end 14₁, 14₂ of the main body portion 12, in embodiments.

Each attachment 60, 62, 64, 66, 68, 70, 72, 84, 90, 100, 200 may include a base portion 74, a working portion 76, and a neck 78 that extends from the base portion 74 to the working portion 76. The respective working portion 76 of each attachment 60, 62, 64, 66, 68, 70, 72, 84, 90, 100, 200 may include one or more components for observing or treating a user's oral cavity. For example, the working portion 76 of the bristle brush tool attachment 60 comprises a plurality of soft bristles for brushing, the working portion 76 of the orthodontic brush tool attachment 62 includes two sets of stiff bristles separated and shaped so as to clean orthodontia, the working portion 76 of the scaler tool attachment 64 includes a stiff, pointed working tip for cleaning between teeth and at the interface of teeth and gums, and so on.

The base portion 74 may define a longitudinal aperture 80. As shown in FIGS. 5, 13, and 15, an inner surface of the base portion 74 may include a receiving formation 82 or other mating structure that is complementary with a mating structure on the main body portion 12, such as the protrusion 30. As shown in FIG. 5, the base portion 74—and thus the attachment 60, 62, 64, 66, 68, 70, 72, 84, 90, 100, 200—may be coupled to the main body portion 12 by inserting the base portion 74 over the longitudinal end of the main body portion 12 such that at least a portion of the reduced-diameter portion 28 of the main body portion 12 (e.g., the light housing 38) extends into and at least partially through the longitudinal aperture 80 of the base portion 74. The base portion 74 may be secured to the main body portion by coupling of the receiving formation 82 with the protrusion 30 (e.g., a snap-fit), as well as by friction of contact between the base portion 74 and the outer cylindrical portion 18, and between the base portion 74 and the light housing 38. As noted above, the outer cylindrical portion 18 and the light housing 38 may be spaced apart from one another so as to define an annular space, and the base portion 74 may insert into that annular space so as to be held by friction with both the outer cylindrical portion 18 and the light housing 38. When an attachment 60, 62, 64, 66, 68, 70, 72, 84, 90, 100, 200 is coupled with the main body portion 12, the longitudinal axis A may extend through the aperture 80.

In addition to providing a coupling means and a means by which a light source 32 may project light onto a working portion 76 of the attachments 60, 62, 64, 66, 68, 70, 72, 84, 90, 100, 200 the aperture 80 may additionally serve as a safety precaution. Although the attachments 60, 62, 64, 66, 68, 70, 72, 84, 90, 100, 200 include robust features for ensuring a secure connection between the attachments 60, 62, 64, 66, 68, 70, 72, 84, 90, 100, 200 and the main body portion, in the unlikely event that an attachment 60, 62, 64, 66, 68, 70, 72, 84, 90, 100, 200 becomes inadvertently dislodged from the main body portion 12 and is partially swallowed by a user, the aperture 80 will allow the passage of air so as to prevent choking by the user.

When an attachment 60, 62, 64, 66, 68, 70, 72, 84, 90, 100, 200 is coupled with the main body portion 12, the attachment 60, 62, 64, 66, 68, 70, 72, 84, 90, 100, 200 may be substantially radially flush with the main body portion 12, in some embodiments. That is, an outer diameter of the base portion 74 may be substantially the same as an outer diameter of the main body portion that is immediately longitudinally adjacent to the base portion 74, such that the base portion 74 of the attachment 60, 62, 64, 66, 68, 70, 72, 84, 90, 100 200 may maintain the outer profile of the main body portion 12, as illustrated in FIGS. 1 and 5.

When an attachment 60, 62, 64, 66, 68, 70, 72, 84, 90, 100, 200 is coupled with the main body portion 12, the distal surface of the base portion 74 may be substantially flush with the light-transmissive cover 40, in some embodiments. That is, the base portion 74 and the light-transmissive cover 40 may appear to collectively define a substantially flat surface, as illustrated in FIGS. 1 and 5.

The base portion 74, neck portion 78, and one or more portions of the working portion 76 may comprise a monolithic body of material, in embodiments. That material may be, for example, a polypropylene material or other polymer.

Figure 16:
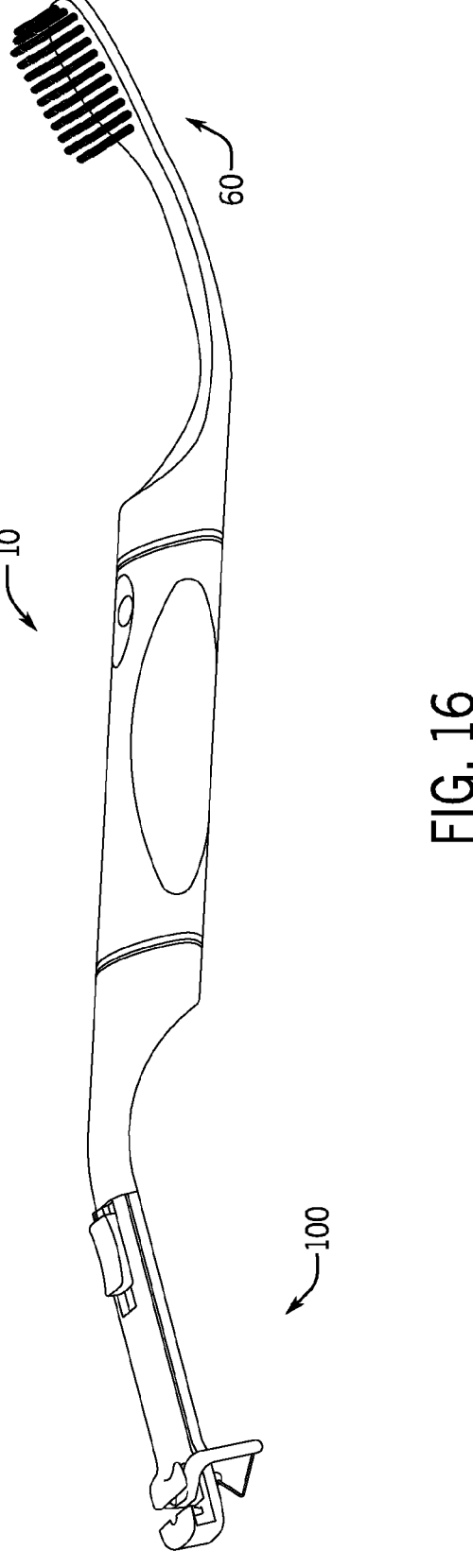
FIG. 16 is a perspective view of an example double-ended dental tool including an example flosser attachment and an example brush attachment.
Figure 17A:
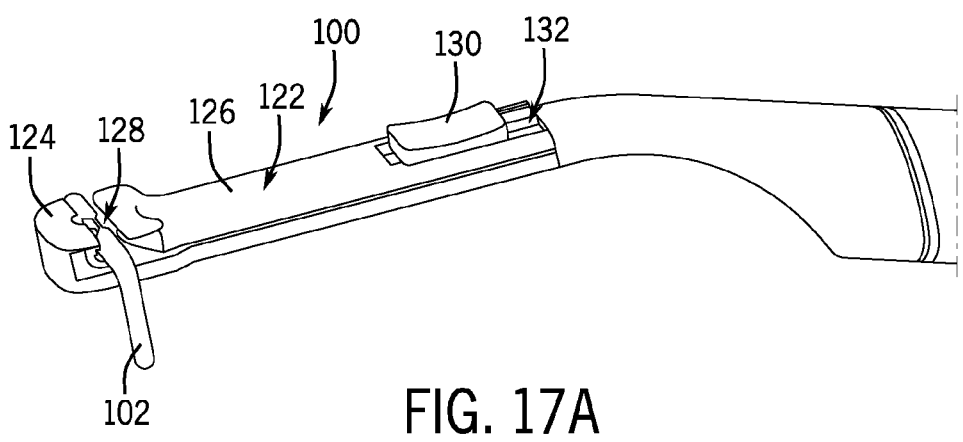
FIGS. 17A, 17B, and 17C are perspective views of an example flosser attachment in neutral, back, and forward positions, respectively.
Figure 17B:
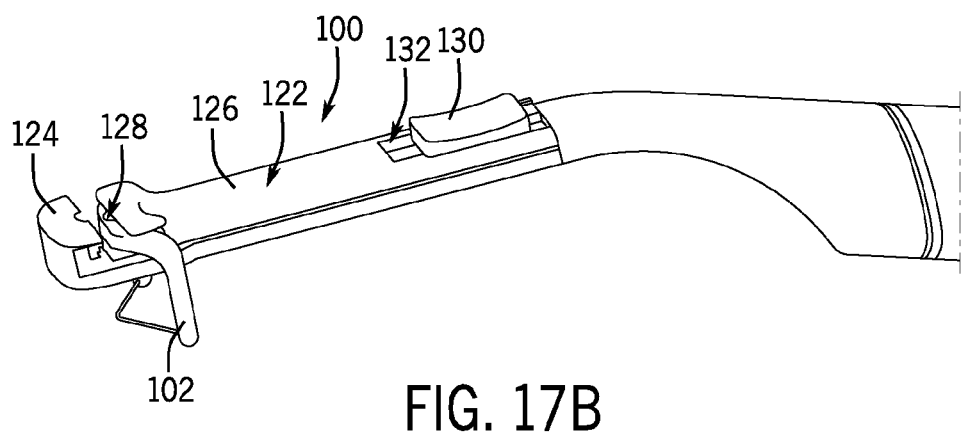
Figure 17C:
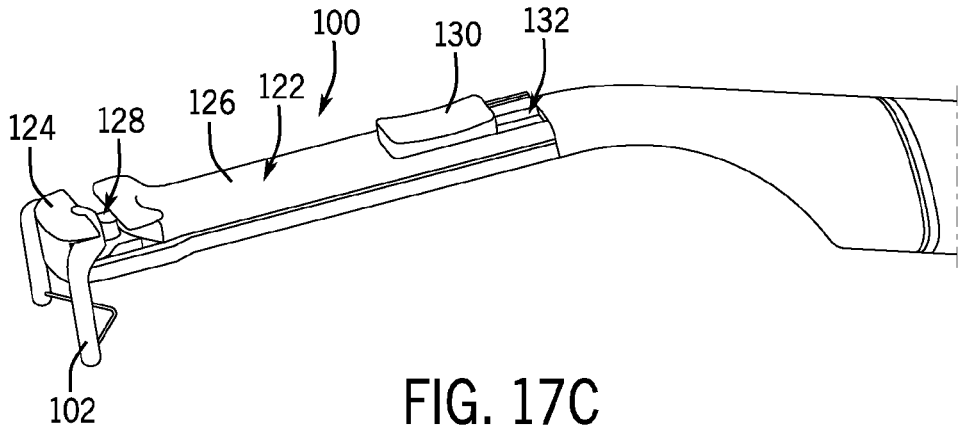
Figures 18A, 18B:
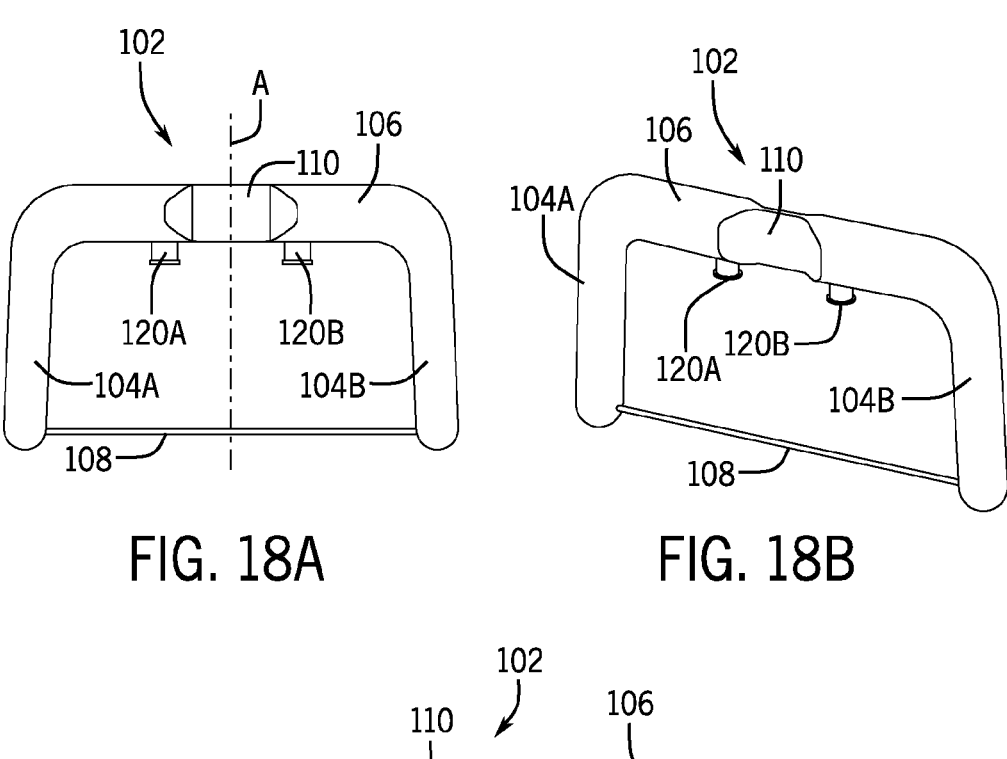
FIGS. 18A, 18B, 18C, and 18D are various views of a flosser member of an example flosser attachment.
Figure 18C:
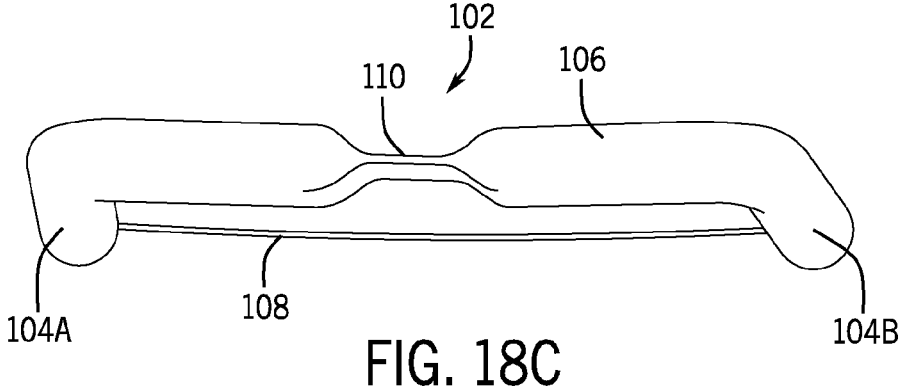
Figure 18D:
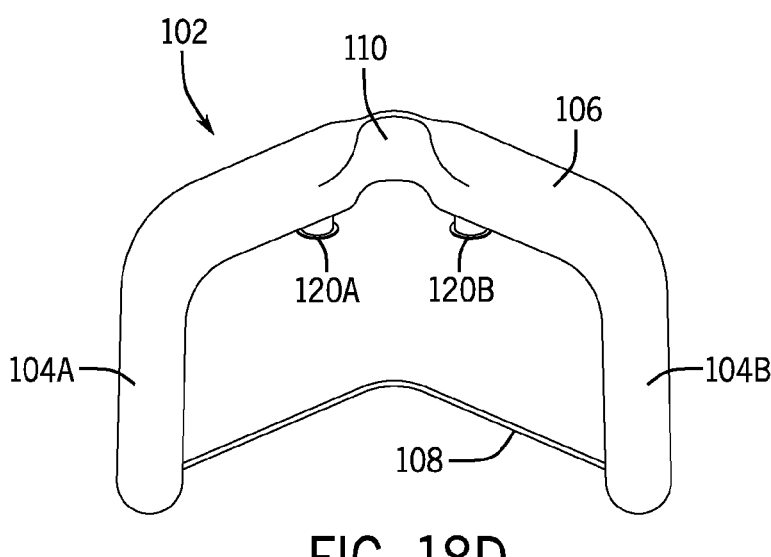

In some embodiments, a flosser attachment 100, 200 may be provided for the tool 10, which may serve as an attachment 14. A first example flosser attachment 100, and components thereof, are illustrated in FIGS. 16-20. A second example flosser attachment 200, and components thereof, are illustrated in FIGS. 21-24B. The first and second flosser attachments 100, 200 share many similarities and should be considered identical except as described below or as illustrated differently. Both flosser attachments 100, 200 may couple with the tool 10 in a similar manner as the other attachments illustrated and described herein, as shown in FIG. 16.

The flosser attachment 100 may include a movable flosser member 102 (best shown in FIGS. 18A-18D) that includes two arms 104A, 104B (which may be referred to individually as an arm 104 or collectively as the arms 104) coupled to each other by a transverse shoulder portion 106 and a piece of floss 108 coupled to and extending between the two arms 104. The shoulder portion 106 may define or may include a hinge 110, which may be a living hinge, in some embodiments. The arms 104 may extend downward from the transverse shoulder portion 106 and may be substantially perpendicular to the transverse shoulder portion 106, in some embodiments. An axis of rotation A (labelled in FIG. 18A) defined by the hinge 110 may be substantially parallel with the arms 104, in some embodiments.

The flosser member 102 may further include one or more protrusions 120A, 120B or recesses, formed on or in the transverse shoulder portion 106, that enable removable coupling of the head portion to the body of the flosser attachment. The example flosser member 102 of FIGS. 18A-18D includes two such protrusions 120A, 120B.

The flosser attachment 100 may further include an adjustment body 112 (shown best in FIG. 21) that includes a generally linear neck portion 114 and a pronged receiving portion 116 disposed at a distal end of the neck portion 114. The pronged receiving portion 116 may define two recesses or apertures 118A, 118B configured to mate with protrusions 120A, 120B on the shoulder portion 106. In other embodiments, the pronged receiving portion 116 may include protrusions, and the shoulder portion 106 may include recesses or apertures. Accordingly, the pronged receiving portion 116 may have zero or more recesses or apertures and/or zero or more protrusions, and the shoulder portion 106 may have mating zero or more recesses or apertures and/or zero or more protrusions. The adjustment body 112 may further include a button 130 accessible to the user and configured for user manipulation of the adjustment body 112 so as to actuate the flosser member 102. The button 130 may be rigidly coupled to the pronged receiving portion 116, such that user actuation of the button 130 results in actuation of the flosser member 102 between positions, described below.

In some embodiments, the button 130 may be rigidly coupled to the pronged receiving portion 116 via the neck portion 114.

The flosser member 102 may be removably coupled with the adjustment body 112, in some embodiments, and may be intended for a single use or a small number of uses before disposal and replacement.

The flosser attachment 100 may further include a housing 122 that includes a head portion 124 and a neck portion 126. The housing 122 may be sized and shaped so that the light source of the dental tool illuminates the flosser member (and the piece of floss 108 secured by the flosser member 102) when the flosser attachment 100 is coupled with the tool. The head portion 124 may define a pivot 128 in which the hinge 110 of the flosser member is disposed and about which the hinge 110 of the flosser member articulates. The pivot 128 may be or may include, in some embodiments, a slot.

The neck portion 126 may define an enclosure in which the adjustment body 112, or at least a portion of the adjustment body 112, is disposed. The neck portion 126 may further define an aperture 132 through which a portion of the adjustment body 112, such as the button 130, protrudes.

The button 130 may be actuated by the user to move the flosser member 102 between two or more positions. For example, the flosser member 102 may be linearly movable between a neutral position (shown in FIG. 17A), a back position (shown in FIG. 17B), and a forward position (shown in FIG. 17C). The flosser member 102 may flex or otherwise articulate across its hinge 110 when moved between positions, responsive to pressure from the adjustment body 112. The direction of movement of the adjustment body 112 may be perpendicular to the hinge axis of hinge 110, in some embodiments.

Figure 19A:
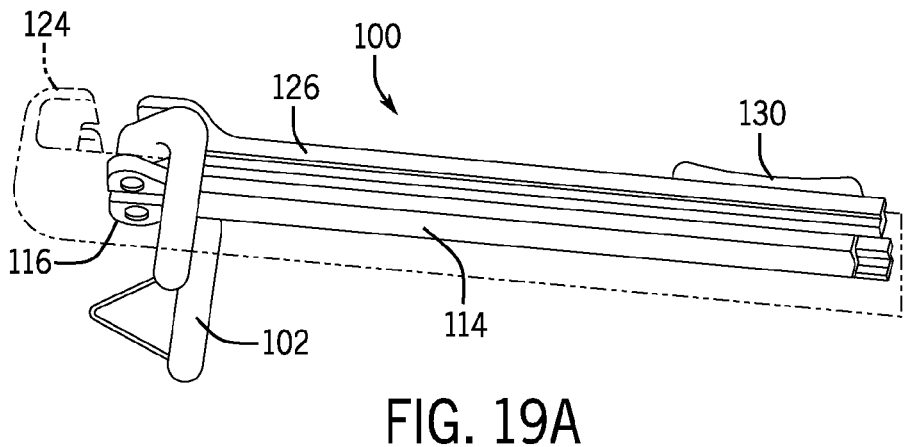
FIGS. 19A and 19B are perspective views of a portion of an example flosser attachment, with certain exterior components illustrated as translucent.
Figure 19B:
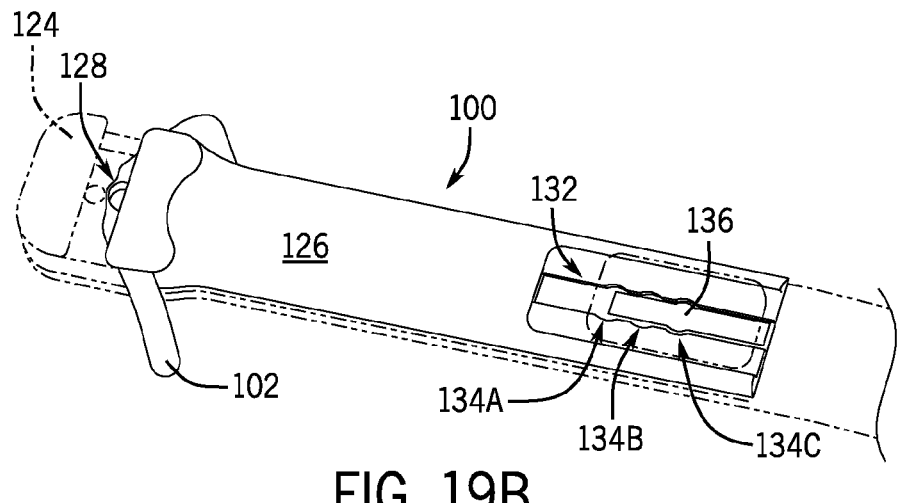
Figure 20:
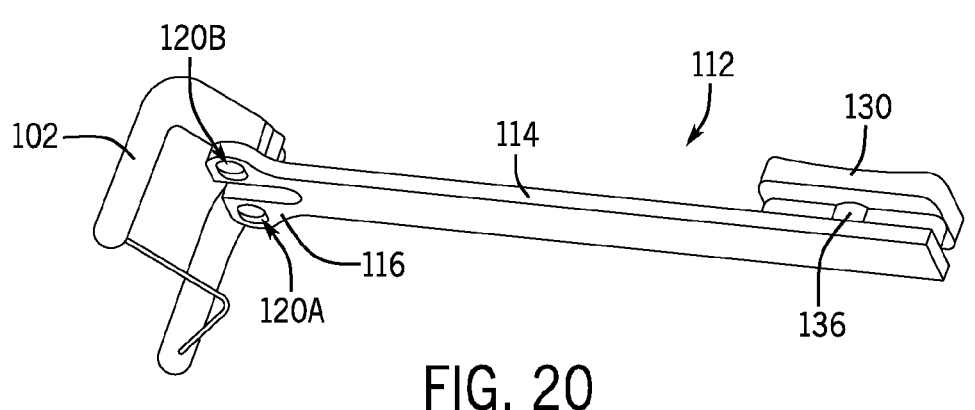
FIG. 20 is a perspective view of an example adjustment portion and an example flosser member of an example flosser attachment.

The housing 122 and adjustment body 112 may have complementary features for securing the flosser member 102 in a desired one of the above-noted positions. For example, as shown in FIG. 19B and FIG. 20, the housing aperture 132 may define one or more detents $134_1$, $134_2$, $134_3$ (e.g., one detent 134 per desired position), and the adjustment body 112 may include a protrusion 136 configured to mate with and move between the detents 134.

Figure 21:
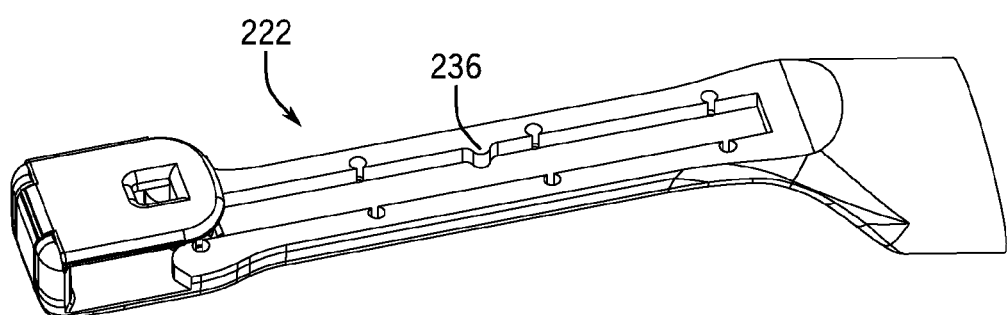
FIG. 21 is a perspective view of a portion of a housing for a flosser attachment.
Figure 22:
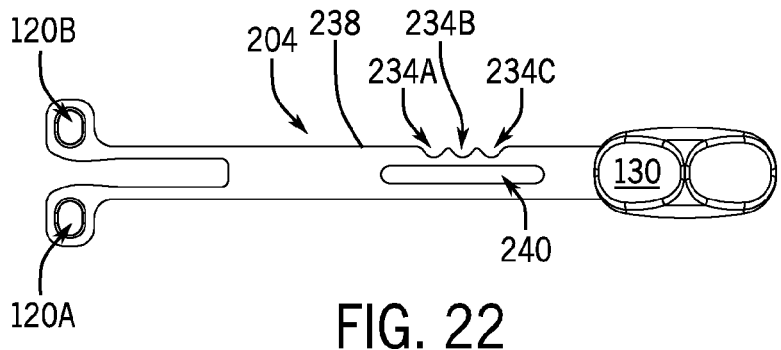
FIG. 22 is a top view of an adjustment portion of a flosser attachment.
Figure 23:
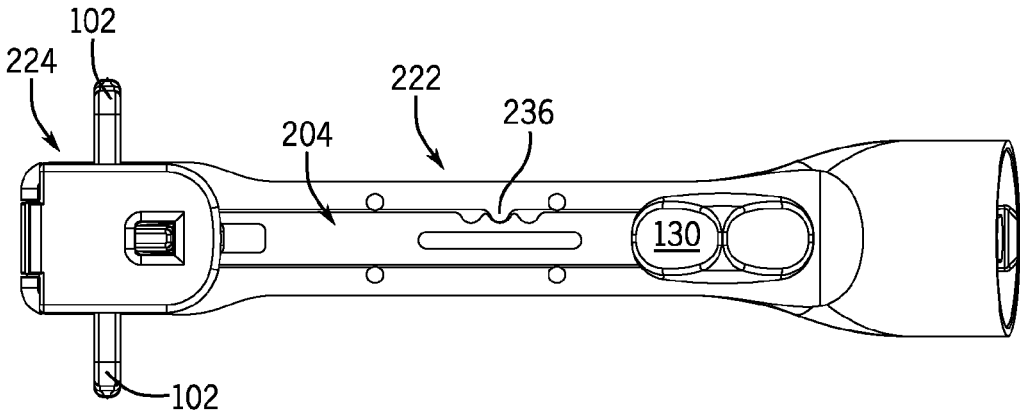
FIG. 23 is a top view of an assembly including the housing portion of FIG. 21, the adjustment portion of FIG. 22, and a flosser member.
Figure 24A:
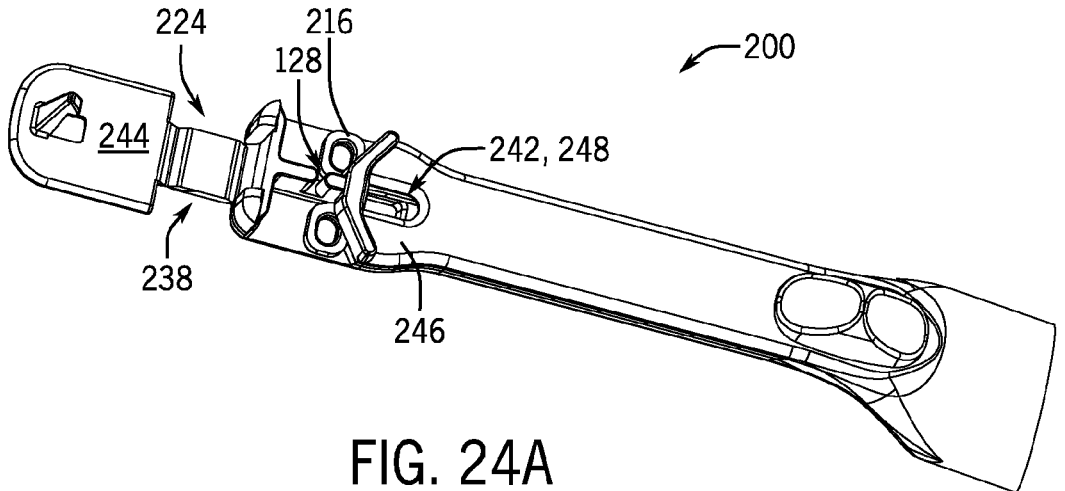
FIG. 24A is a perspective view of an example flosser attachment including the housing portion of FIG. 21, the adjustment portion of FIG. 22, and the flosser member of FIG. 23.
Figure 24B:
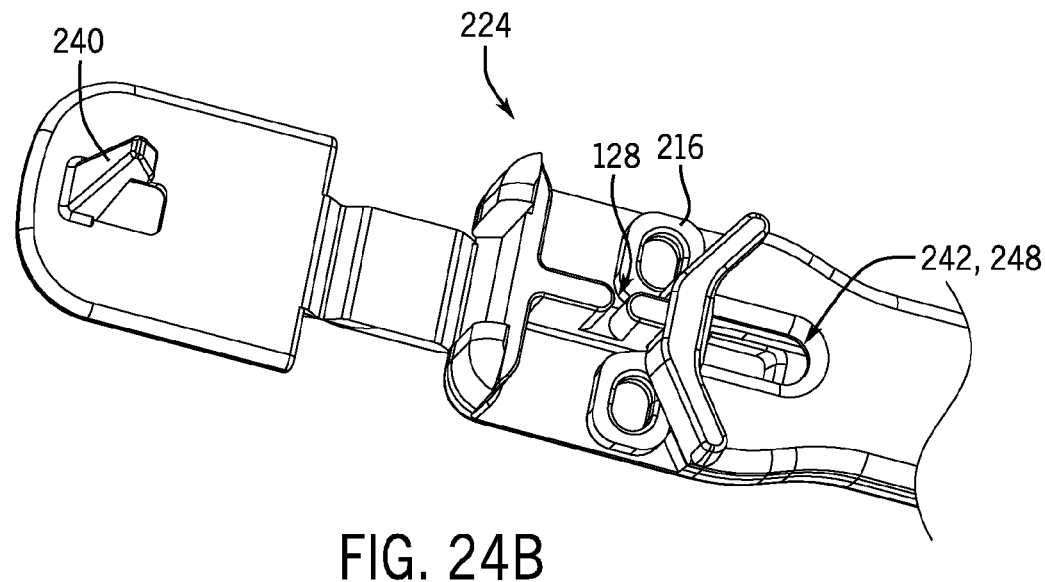
FIG. 24B is an enlarged view of a portion of FIG. 24A.

FIGS. 21-24B are various views of a second embodiment of the flosser attachment 200. Specifically, FIG. 21 illustrates a housing 222 with a cover thereof removed, FIG. 22 illustrates an adjustment body 204, and FIG. 23 illustrates an assembly including the portion of housing 222 shown in FIG. 21, the adjustment body 204, and the flosser member 102. FIGS. 21-23 illustrate the flosser attachment 200 in a closed position. FIGS. 24A and 24B illustrate the flosser attachment 200 in an open position to enable the flosser member 104 to be inserted or removed.

The flosser attachment 200 may include a flosser member 102, an adjustment body 204, and a housing 222. The adjustment body 204 may define three detents $234_1$, $234_2$, $234_3$ in an edge 238 of the adjustment body 204 and an aperture 240 adjacent to the detents 234 to permit the edge 238, or a think piece of material defining the edge 238, to flex and enable a protrusion 236 to move between the detents 234.

The housing 222 may include a protrusion 236 that mates with the detents 234. As the adjustment body 204 is slid distal or proximal within the housing 222, the protrusion 236 is moved between detents 234 (or, more specifically, the detents 234 are moved over the protrusion 236).

FIGS. 25A and 25B illustrate an open position of the flosser attachment. The housing 222 head portion 224 may include a hinged distal end 238 that folds open to permit the flosser member 102 to be coupled to, or uncoupled from, the adjustment body 204. When closed, the head portion 224 may secure the hinge 110 of the flosser member 102 in the pivot 128. The head portion 224 may include mating features, such as a protrusion 240 on a movable portion 244 of the head portion and a recess 242 on a fixed portion 246 of the head portion, and the protrusion 240 may be secured by the recess 242 to close the head portion 224. The pronged receiving portion 216 of the adjustment body 204 may include a gap 248, and the protrusion 240 or a portion thereof may extend into the gap 248.

The tool 10 and attachments 60, 62, 64, 66, 68, 70, 72, 84, 90, 100, 200 may provide many functional advantages. First, each of the attachments 60, 62, 64, 66, 68, 70, 72, 84, 90, 100, 200 may effectively clean a user's teeth, a portion thereof, or an orthodontic treatment, and/or allow the user to view the user's oral cavity. Second, the attachments 60, 62, 64, 66, 68, 70, 72, 84, 90, 100, 200 may be selectively couplable with the main body portion 12, thus allowing a user to customize a personal tool 10 and to use many different attachments with a single main body portion 12. Third, a wide variety of attachments may be available, in embodiments, further enhancing the customizability of the tool 10. Fourth, the tools that may be available for the tool 10 may be sufficiently durable that a user can use each tool numerous times before the tool requires replacement. Fifth, the ends of the main body portion may be curved in opposite directions, such that the tools extends in opposite directions from the main body portion, thereby enabling the user to quickly and easily flip the tool 10 in his or her hand to use the opposite end of the tool 10.

It should be noted that various changes and modifications to the present embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

What is claimed is:

1. A dental flosser comprising:
a flosser member configured to secure a piece of dental floss, the flosser member comprising:
two arms extending in parallel from a base, where the base extends between proximal ends of the two arms, the base has a hinged portion formed at a central portion thereof and first and second lateral portions adjacent the hinged portion, the first lateral portion having a first connection feature, the second lateral portion having a second connection feature;

each arm of the two arms is configured to secure a respective end of the piece of dental floss;

wherein an axis of rotation defined by the hinge is generally parallel with the arms;

an adjustment body coupled to the flosser member, wherein the adjustment body is an elongated body with an actuator at a proximal end thereof and third and fourth connection features provided at a distal end thereof which couple to the first and second connection features, respectively;

wherein the first and second connection features are protrusions and the third and fourth connection features are apertures, or the first and second connection features are apertures and the third and fourth connection features are protrusions;

whereby linear movement of the actuator results in linear movement of the elongated body and the third and fourth connection features which push or pull the first and second connection features in the longitudinal direction to fold the arms about the hinged portion.

2. The flosser of claim 1, further comprising a housing, the housing comprising a head portion, wherein the head portion defines a pivot, the hinged portion disposed at the pivot, wherein the adjustment body is coupled with the housing so as to be movable with respect to the pivot.

3. The flosser of claim 2, the housing further comprising a neck portion that is proximal to the head portion, at least a portion of the adjustment body disposed in the neck portion.

4. The flosser of claim 3, wherein the actuator comprises a user-actuatable button accessible to the user, wherein user actuation of the button causes the movement of the adjustment body.

5. The flosser of claim 1, wherein the hinged portion is a living hinge.

6. The flosser of claim 1, wherein the adjustment body comprises a generally linear portion and a receiving portion at a distal end of the generally linear portion, the receiving portion coupled with the flosser member.

7. A dental tool comprising:

a main body portion comprising a light source; and a flosser member coupled with the main body portion, configured to secure a piece of dental floss, the flosser member comprising:

two arms extending in parallel from a base, where the base extends between proximal ends of the two arms, the base has a hinged portion formed at a central portion thereof and first and second lateral portions adjacent the hinged portion, the first lateral portion having a first connection feature, the second lateral portion having a second connection feature;

wherein each arm of the two arms is configured to secure a respective end of the piece of dental floss;

wherein an axis of rotation defined by the hinge is generally parallel with the arms; and an adjustment body coupled to the flosser member, wherein the adjustment body is an elongated body with an actuator at a proximal end thereof and third and fourth connection features provided at a distal end thereof which couple to the first and second connection features, respectively, wherein the first and second connection features are protrusions and the third and fourth connection features are apertures, or the first and second connection features are apertures and the third and fourth connection features are protrusions;

whereby linear movement of the actuator results in linear movement of the elongated body and third and fourth connection features which push or pull the first and second connection features in the longitudinal direction to fold the arms about the hinged portion.

8. The dental tool of claim 7, wherein the flosser further comprises a housing, the housing comprising a head portion, wherein the head portion defines a pivot, the hinged portion disposed at the pivot, wherein the adjustment body is coupled with the housing so as to be movable with respect to the pivot.

9. The dental tool of claim 8, the housing further comprising a neck portion that is proximal to the head portion, at least a portion of the adjustment body disposed in the neck portion.

10. The dental tool of claim 9, wherein the actuator comprises a user-actuatable button accessible to the user, wherein user actuation of the button causes the movement of the adjustment body.

11. The dental tool of claim 7, wherein the hinged portion is a living hinge.

12. The dental tool of claim 7, wherein the adjustment body comprises a generally linear portion and a receiving portion at a distal end of the generally linear portion, the receiving portion coupled with the flosser member.

* * * * *